G. G. MELHART.
BURNER.
APPLICATION FILED MAY 17, 1911.
1,010,294.
Patented Nov. 28, 1911.
2 SHEETS—SHEET 1.
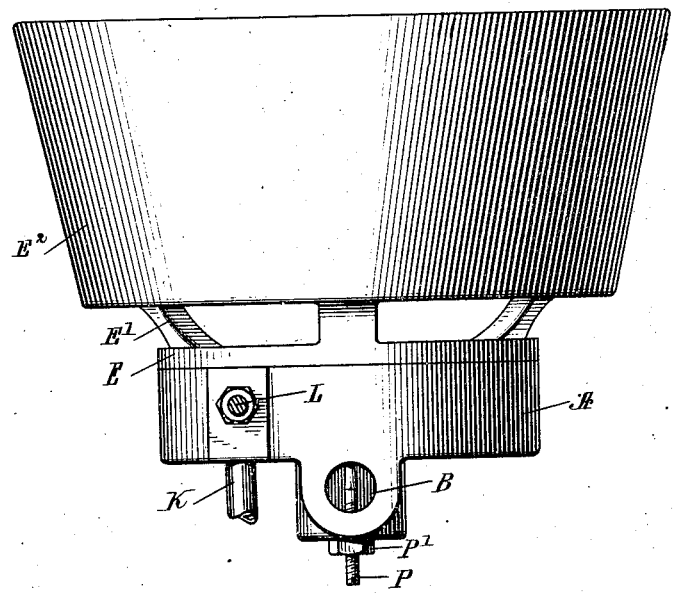
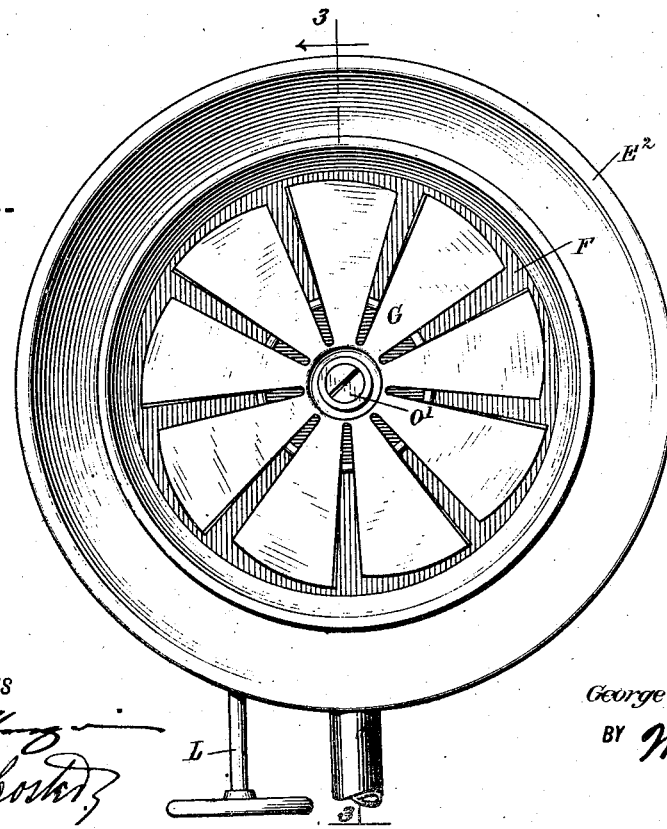
WITNESSES
INVENTOR
George G. Melhart
BY
ATTORNEYS

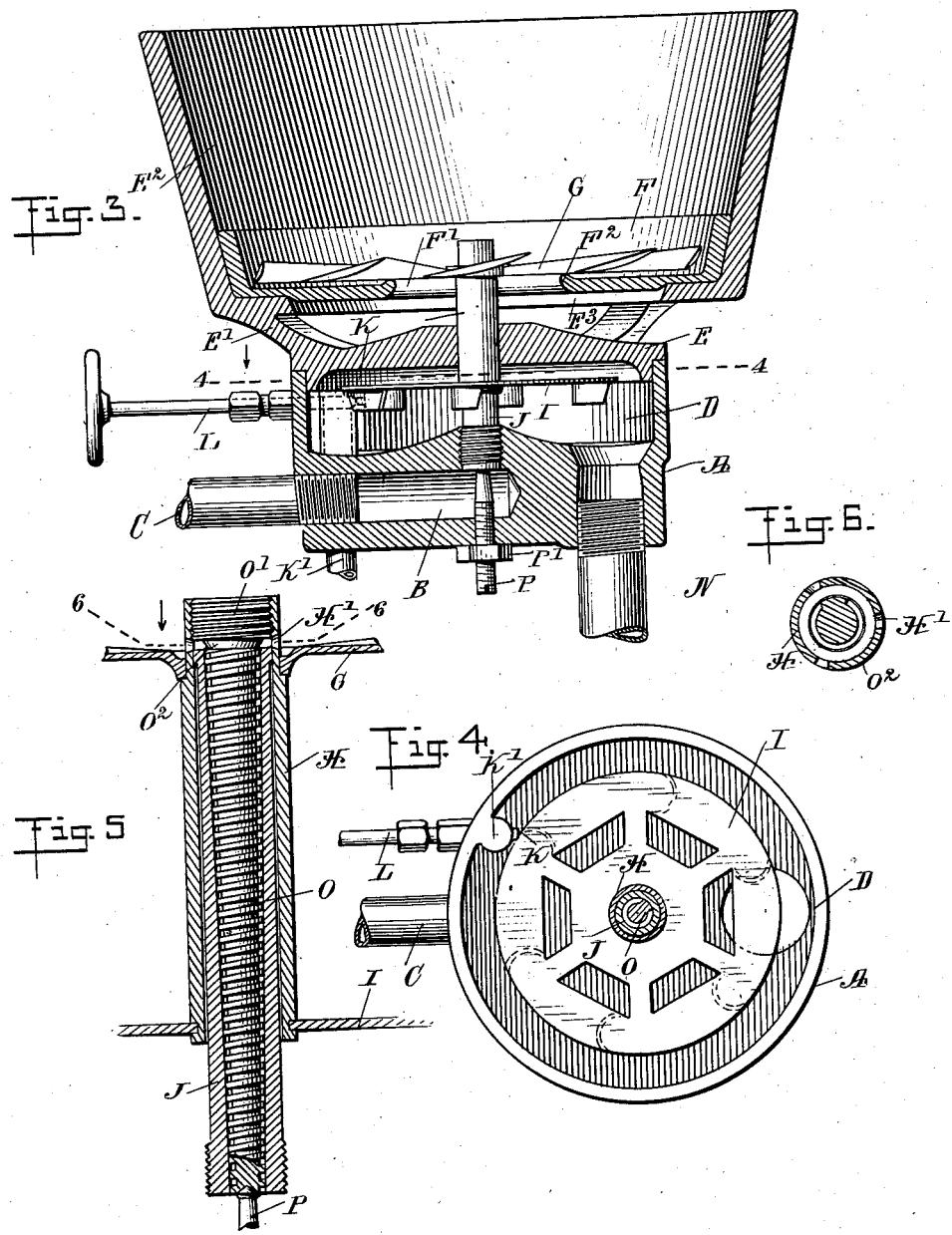

UNITED STATES PATENT OFFICE.

GEORGE GOTTLIEB MELHART, OF WHITTIER, CALIFORNIA.

BURNER.

1,010,294.  Specification of Letters Patent.  Patented Nov. 28, 1911.

Application filed May 17, 1911. Serial No. 627,668.

*To all whom it may concern:*

Be it known that I, GEORGE G. MELHART, a citizen of the United States, and a resident of Whittier, in the county of Los Angeles and State of California, have invented a new and Improved Burner, of which the following is a full, clear, and exact description.

The object of the invention is to provide a new and improved burner, more especially designed for use in kitchen stoves, ranges, and the like, for burning liquid fuel such as crude oil, and arranged to readily atomize the liquid fuel and to thoroughly mix the same with air to insure complete combustion of the liquid fuel and to produce an intense flame and heat without danger of the parts becoming clogged up.

For the purpose mentioned, use is made of a fan wheel mounted to rotate in a burner bowl and having a hollow hub carrying a power-driven wheel for rotating the fan wheel, and feeding means arranged in the said hub and connected with a liquid fuel supply to feed the liquid fuel onto the top of the fan wheel.

A practical embodiment of the invention is represented in the accompanying drawings forming a part of this specification, in which similar characters of reference indicate corresponding parts in all the views.

Figure 1 is a side elevation of the burner; Fig. 2 is a plan view of the same; Fig. 3 is a cross section of the same on the line 3—3 of Fig. 2; Fig. 4 is a sectional plan view of the same on the line 4—4 of Fig. 3; Fig. 5 is an enlarged sectional side elevation of the feeding device; and Fig. 6 is a sectional plan view of the same on the line 6—6 of Fig. 5.

A suitably constructed casing A is provided in its bottom with a recess B connected by a pipe C with a liquid fuel supply arranged to feed the liquid fuel, such as crude oil and the like, by gravity into the recess B. In the upper portion of the casing A is arranged a water chamber D closed by a cover E provided with upwardly and outwardly extending arms E' supporting a burner bowl $E^2$ containing a dish or a pan F having a central opening F' in register with a corresponding opening $E^3$ in the bottom of the bowl $E^2$ so that atmospheric air can pass through the openings $E^3$ and F' into the dish or pan F, which latter is provided at the opening F' with a ridge $F^2$ for retaining the liquid fuel in the dish or pan F. The dish or pan F is mounted to receive a fan wheel G secured on a hub H extending through the openings F' and $E^3$ and through the top of the cover E into the water chamber D, the lower end of the said hub H carrying a water wheel I adapted to be driven by water pressure in the water chamber D to rotate the fan wheel G. The hub H carrying the wheels G and I is mounted to rotate on a tubular bearing J screwed at its lower end into the bottom of the chamber D and opening at its lower end into the recess B so that the liquid fuel can pass into the tubular bearing J. A nozzle K in the water chamber D directs water under pressure against the wheel J, to rotate the same, and the nozzle K is connected with a water inlet K' connected with a water pressure and having a valve L for regulating the amount of water passing through the nozzle K into the chamber D and against the water wheel I so as to rotate the same, the bottom of the water chamber D being provided with an outlet pipe N for conducting the spent water to a suitable place of discharge.

Within the bearing J is arranged a feed screw O, screwed or otherwise secured at its upper end O' to the upper end of the hub H a distance above the top of the fan wheel G, as plainly indicated in Figs. 3 and 5, and the said feed screw O is provided near its upper end O' with a groove $O^2$ in register with ports H' formed in the hub H directly above the blades of the fan wheel G so that the oil carried up by the feed screw O can pass from the groove $O^2$ by way of the ports H' onto the top of the fan wheel G, to be thrown outwardly by the said fan wheel and thus atomizing the oil, at the same time mixing it with the air drawn by the fan wheel G through the registering opening F' into the dish or pan F.

The bore of the bearing J and the feed screw O are preferably made tapering, as plainly shown in Fig. 5, and the lower end of the feed screw O rests on the pointed end of a screw P screwing in the bottom of the casing A and locked thereon by a jam nut P' after the adjusting screw P is adjusted, to hold the feed screw O in the desired position in the bearing J, for feeding more or less oil from the recess B to the top of the fan wheel G.

It is understood that when the burner is in use the water pressure passing into the water chamber D acts on the water wheel I to rotate the same, and in doing so the water wheel I turns the hub H and consequently the fan wheel G and with it the feed screw O so that oil is fed from the recess B by the feed screw O upwardly within the bearing J, the oil being finally discharged onto the fan wheel G, as previously explained.

It is understood that the fan wheel G has the double function of throwing the liquid fuel outwardly within the dish or pan F and at the same time drawing the air through the opening F' so that the air is thoroughly mixed with the minutely divided liquid fuel to form a highly combustible mixture to be burned within the bowl $E^2$.

It is also understood that the burning fuel causes a heating of the casing A and the parts carried thereby whereby the oil is atomized as it ascends in the bearing J by the action of the feed screw O, and by making the latter and the bore of the bearing J tapering it is evident that the vaporized oil can readily ascend owing to the gradual increase in the diameter of the feed screw.

It is further understood that by adjusting the screw P more or less oil can be fed by the feed screw O to the fan wheel G according to the consumption of the oil in the burner bowl $E^2$, and as the feeding of the oil is continuous and uniform, it is evident that a proper burning and complete combustion of the fuel is had.

Having thus described my invention, I claim as new and desire to secure by Letters Patent:

1. A burner, comprising a casing having a burner bowl provided with an air inlet, a driven fan wheel extending in the said bowl and having a hub, a fixed tubular bearing having a lower oil inlet and extending upwardly within said hub to support the same, and a feed screw secured at its upper end to the said fan wheel and extending downwardly in the said bearing, the upper end of the feed screw delivering the oil to the said fan wheel.

2. A burner, comprising a casing having a burner bowl provided with an air inlet, a driven fan wheel extending in the said bowl and having a hub, a fixed tubular bearing having an oil inlet and on which the said hub is mounted to turn, and a feed screw secured to the said fan wheel and extending in the said bearing, the upper end of the feed screw having a groove for receiving the oil from the screw thread, the said fan wheel hub having openings in register with the said groove for the oil to pass onto the fan wheel centrally at the top.

3. A burner, comprising a casing having a burner bowl provided with an air inlet, a driven fan wheel extending in the said bowl and having a hub, a fixed tubular bearing having an oil inlet and on which the said hub is mounted to turn, and a feed screw secured to the said fan wheel and extending in the said bearing, the upper end of the feed screw delivering the oil to the said fan wheel, the said feed screw and the bore of the bearing being conical.

4. A burner, comprising a casing having a burner bowl provided with an air inlet, a driven fan wheel extending in the said bowl and having a hub, a fixed tubular bearing having an oil inlet and on which the said hub is mounted to turn, a feed screw secured to the said fan wheel and extending in the said bearing, the upper end of the feed screw delivering the oil to the said fan wheel, and a regulating screw on the said casing and engaging the lower end of the said feed screw to adjust the latter in the bearing.

5. A burner, comprising a casing having an inlet and having a water chamber closed by a cover, a burner bowl above the cover, a dish seated in the said bowl and having a central opening and a raised rim around the wall of the opening, a fan wheel in the said dish, the said fan wheel having a hub provided at its upper end with openings leading to the top of the wheel blades, a fixed tubular bearing on which rotates the said hub having an oil inlet at its lower end, a feed screw in the said bearing and secured at its upper end to the said fan wheel hub, the said feed screw having a groove in register with the said hub openings, and a water wheel in the said water chamber and attached to the said fan wheel hub.

In testimony whereof I have signed my name to this specification in the presence of two subscribing witnesses.

GEORGE GOTTLIEB MELHART.

Witnesses:
   Wm. Greenhalgh,
   L. I. Cowgill.